United States Patent [19]

Aoki et al.

[11] Patent Number: 4,662,493
[45] Date of Patent: May 5, 1987

[54] DIRECT-COUPLING CONTROL SYSTEM FOR TORQUE CONVERTER IN AUTOMATIC TRANSMISSION FOR VEHICLES

[75] Inventors: Takashi Aoki, Fujimi; Yoshimi Sakurai, Tanashi; Masao Nishikawa, Tokyo, all of Japan

[73] Assignee: Honda Giken Kogyo Kabushiki Kaisha, Tokyo, Japan

[21] Appl. No.: 677,139

[22] Filed: Nov. 30, 1984

[30] Foreign Application Priority Data

Nov. 30, 1983 [JP] Japan .................... 58-226215
Nov. 30, 1983 [JP] Japan .................... 58-226216

[51] Int. Cl.$^4$ .................... B60K 41/02; B60K 41/22
[52] U.S. Cl. .................... 192/0.052; 192/0.092; 192/3.3; 192/3.31; 192/3.57
[58] Field of Search .................... 192/3.29, 3.3, 3.31, 192/3.57, 0.052, 0.092, 0.076, 86; 74/733

[56] References Cited

U.S. PATENT DOCUMENTS

| | | | |
|---|---|---|---|
| 2,824,632 | 2/1958 | Lucia et al. | 192/3.3 |
| 3,128,642 | 4/1964 | Fisher et al. | 192/3.57 X |
| 3,241,399 | 3/1966 | Fisher et al. | 192/3.3 X |
| 3,262,523 | 7/1966 | Gordon | 192/3.57 X |
| 3,524,523 | 8/1970 | Klimex et al. | 192/3.57 X |
| 3,897,698 | 8/1975 | Ohsaka | 192/3.57 X |
| 4,051,932 | 10/1977 | Arai et al. | 74/733 X |
| 4,095,486 | 6/1978 | Ohnuma | 74/733 X |
| 4,108,289 | 8/1978 | Arai et al. | 192/86 X |
| 4,457,413 | 7/1984 | Hattori | 192/0.076 X |
| 4,468,988 | 9/1984 | Hiramatsu | 192/103 R X |
| 4,516,671 | 5/1985 | Nishikawa et al. | 192/3.31 X |

FOREIGN PATENT DOCUMENTS

| | | | |
|---|---|---|---|
| 0121351 | 7/1983 | Japan | 74/733 |
| 0121352 | 7/1983 | Japan | 74/733 |
| 106755 | 6/1984 | Japan | |

Primary Examiner—Rodney H. Bonck
Attorney, Agent, or Firm—Armstrong, Nikaido, Marmelstein & Kubovcik

[57] ABSTRACT

A direct-coupling control system for torque converter in automatic transmission, comprising a fluid torque converter coupled in series to an auxiliary transmission capable of selectively switching a speed ratio over to one of a plurality of different stages and a direct-coupling mechanism capable of directly mechanically coupling together input and output members of the torque converter using the engaging capacity determined by the function of difference between the actuating pressure acting on the engaging side of the torque converter and the internal pressure acting on the release side thereof. The control system is also provided with a switch valve for allowing the actuating oil to escape to an oil tank synchronously with the speed change operation, and a supplementary mechanism for performing a switching operation so as to raise the internal pressure of the torque converter synchronously with the speed change operation. There is further provided with a supplementary oil passage for supplementing pressurized oil to the torque converter and a switch device for allowing the actuating oil to escape to the oil tank and opening the supplementary oil passage when the throttle opening is at an idle position.

9 Claims, 3 Drawing Figures

DIRECT-COUPLING CONTROL SYSTEM FOR TORQUE CONVERTER IN AUTOMATIC TRANSMISSION FOR VEHICLES

BACKGROUND OF THE INVENTION

1. Field of the Invention

This invention relates to a direct-coupling control system for torque converter in an automatic transmission for vehicles.

2. Description of Prior Art

In vehicular automatic transmission equipped with a hydraulic torque converter, it is preferred, in view of fuel economy, power efficiency and serenity, to mechanically directly couple or lock up input and output members of the torque converter together in such a state that its torque amplifying function is not desired and/or is not substantially obtainable. It may be further preferable that such lockup is effected not only in the highest stage but also in a low speed stage. The problem, however, exists in that the shock caused at the time of gear shifting may be enlarged undesirably unless the lockup state is fully released.

In case of systems in which the speed change and lockup are electronically controlled, it is possible to effect the lockup again by releasing the formerly established lockup state prior to the speed change operation after the lapse of a certain time with a speed change command having been given. This enables a sufficient time to be ensured for releasing operation so that the aforementioned problem of increasing the shock caused by gear shifting would not occur; however, the production cost will increase and the system will be complicated.

On the other hand, if the speed change and lockup are hydraulically controlled, the system will be simple and less costly. However, there has not yet been established a method for detecting the speed change operation beforehand. For this reason, the lockup is released simultaneously when the speed change operation is effected so that the release of lockup as well as the re-lockup must be performed within an extremely short time of speed change operation. In order to release the lockup within such a short time, the engaging force of the direct-coupling mechanism is so arranged as to be determined by the function of pressure differential between the internal pressure and working pressure of the torque converter to make the above-described internal pressure always act on a released side. With this arrangement, the lockup can be released with excellent response characteristics only by reducing the working pressure when the speed change operation is effected. Although the present assignee has already filed an application for a patent and disclosed therein such a release mechanism, there has still been an unsolved problem that in such release mechanism, the pressure range which can be utilized as the pushing pressure of the piston will be reduced if the internal pressure of the torque converter is preset high, resulting in that a sufficient engaging force cannot be secured unless a sufficient area is provided on the piston. Accordingly, there may be considered cases where the internal pressure of the torque converter is set at a value slightly smaller than the vehicle speed or is set to decrease in proportion thereto. However, this would result in an increased shock since the lockup is insufficiently released at the time of speed change operation as the internal pressure of the torque converter is decreased.

If the throttle pedal is released to reduce the speed to adjust the interval from a preceding vehicle during cruising or accelerating, it will be preferred to release the lockup as quickly as possible for avoiding the awkwardness and saving the quantity of fuel to be sucked by the carburetor when the speed is being reduced. Accordingly, even if the internal pressure of the torque converter is set rather low, it will be desirable that the lockup state may be released with a quick response by increasing the internal pressure of the torque converter when the throttle pedal is returned to the idle position.

If the actuating pressure applied to the hydraulic clutch is reduced by the increased amount of internal pressure in association with increasing of the internal pressure in the torque converter as mentioned above when the throttle pedal is returned to the idle position, the speed changing operation will be slowed down and the speed changing shock will be mitigated.

SUMMARY OF THE INVENTION

An object of the present invention is to provide a direct-coupling control system for a torque converter in an automatic transmission for vehicles wherein, although the internal pressure of the torque converter is always made to act on the release side to secure response efficiency, the lockup is quickly released by slightly increasing the internal pressure at the time of speed change operation and the internal pressure of the torque converter is rather set low to that extent at the time of normal operation so as to secure the engaging force of a direct-coupling mechanism.

In order to attain the object, according to a first aspect of the present invention, the control system includes a switch valve for allowing the actuating pressure to escape to an oil tank synchronously with the speed change operation and a supplementary mechanism effecting switching operation for increasing the internal pressure of the torque converter synchronously with the speed change operation.

A second object of the present invention is to provide a direct-coupling control system for a torque converter in an automatic transmission for vehicles wherein the lockup is released with excellent response efficiency by slightly increasing the internal pressure of the torque converter when the throttle pedal is returned to the idle position.

In order to attain this object, according to a second aspect of the present invention, the control apparatus includes an independent supplementary oil passage communicating the oil source with the interior of the torque converter and switching means for allowing the actuating pressure of the direct-coupling mechanism to escape to the oil tank and opening the supplementary oil passage when the opening of the throttle is at the idle position.

A third object of the present invention is to provide a direct-coupling control system for a torque converter in an automatic transmission for vehicles wherein the speed change shock is mitigated.

In order to attain the third object, according to a third aspect of the present invention, the control apparatus includes a regulator valve for regulating the oil pressure applied to other hydraulically operating parts, the regulator valve being coupled to the oil inlet passage of the torque converter guiding thereto the excessive pressure, an independent supplementary oil passage branching out from a passage between the regulator valve and the hydraulic source and communicating with the interior of the torque converter and switching means for releasing the actuating pressure of the direct-coupling mechanism to the oil tank and opening the supplementary oil passage when the opening of the throttle is at the idle position.

As above-described, according to the present invention, the engagement of the input and output members established by the direct-coupling mechanism is quickly released by setting rather low the internal pressure of the torque converter at the time of normal operation and temporarily raising the internal pressure of the torque converter at the time of speed change operation to allow the actuating pressure to escape to the oil tank, and the lockup state at the time of speed change operation is quickly released to prevent the speed change shock from being amplified. Moreover, since the internal pressure of the torque converter acts on the direct-coupling mechanism at the side to release the engagement thereof, response efficiency is fully secured.

In addition, the internal pressure of the torque converter is raised when the throttle pedal is released, whereby the lockup state is quickly released by means of the direct-coupling mechanism.

Moreover, the oil pressure applied to other hydraulically operating parts is temporarily reduced when the throttle pedal is released and a speed change stage to be newly established is slowly set up, whereby the speed change shock is mitigated.

Above and other objects' features and advantages of the present invention will be more apparent from the description of the preferred embodiment thereof by referring to the accompanying drawings.

BRIEF DESCRIPTION OF THE DRAWINGS

The drawings show an embodiment of the present invention.

DETAILED DESCRIPTION OF THE PREFERRED EMBODIMENT

Figure 1:
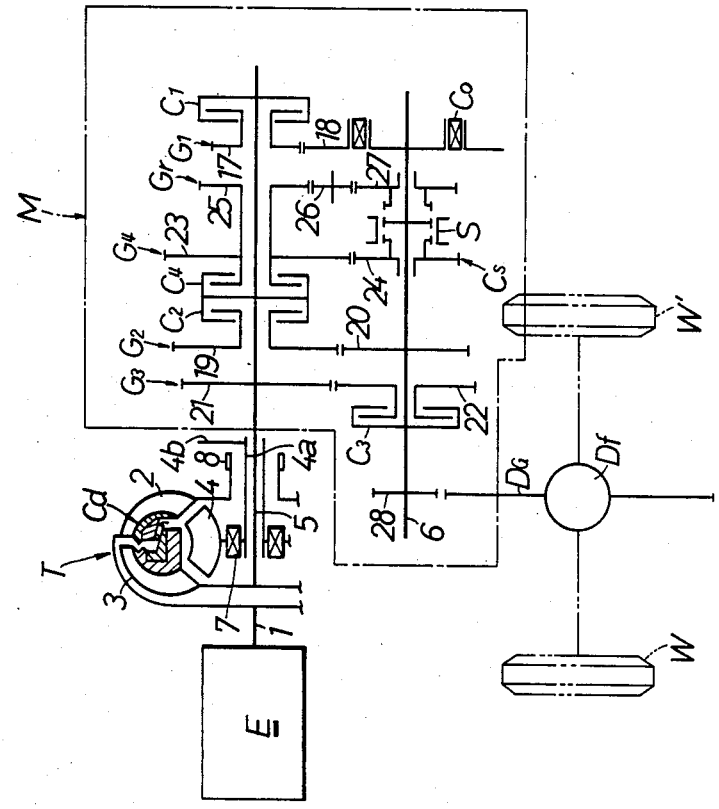
FIG. 1 is a schematic view of an automatic transmission for an automotive vehicle with four forward speed stages and one backward speed stage embodying the present invention.

Referring now to the drawings, an embodiment of the present invention will be described. In FIG. 1 illustrating the outline of an automatic transmission for an automotive vehicle with four forward speed stages and one backward speed stage, the output of an engine E is transmitted from its crank shaft 1 to a fluid torque converter T, auxiliary transmission M, differential gear Df and driving wheels W, W' successively to drive the wheels.

The torque converter T comprises a pump rotor 2 coupled to the crank shaft 1, a turbine rotor 3 coupled to an input shaft 5 of the auxiliary transmission M, a stator rotor 4 coupled to a stator shaft 4a rotatably supported on the input shaft 5 through a unidirectional clutch 7. The torque transmitted from the crank shaft 1 to the pump rotor 2 is fluid-dynamically transmitted to the turbine rotor 3 and, if the torque is amplified during the transmission, the stator rotor 4 bears the reaction force in the well known manner.

Figure 2:
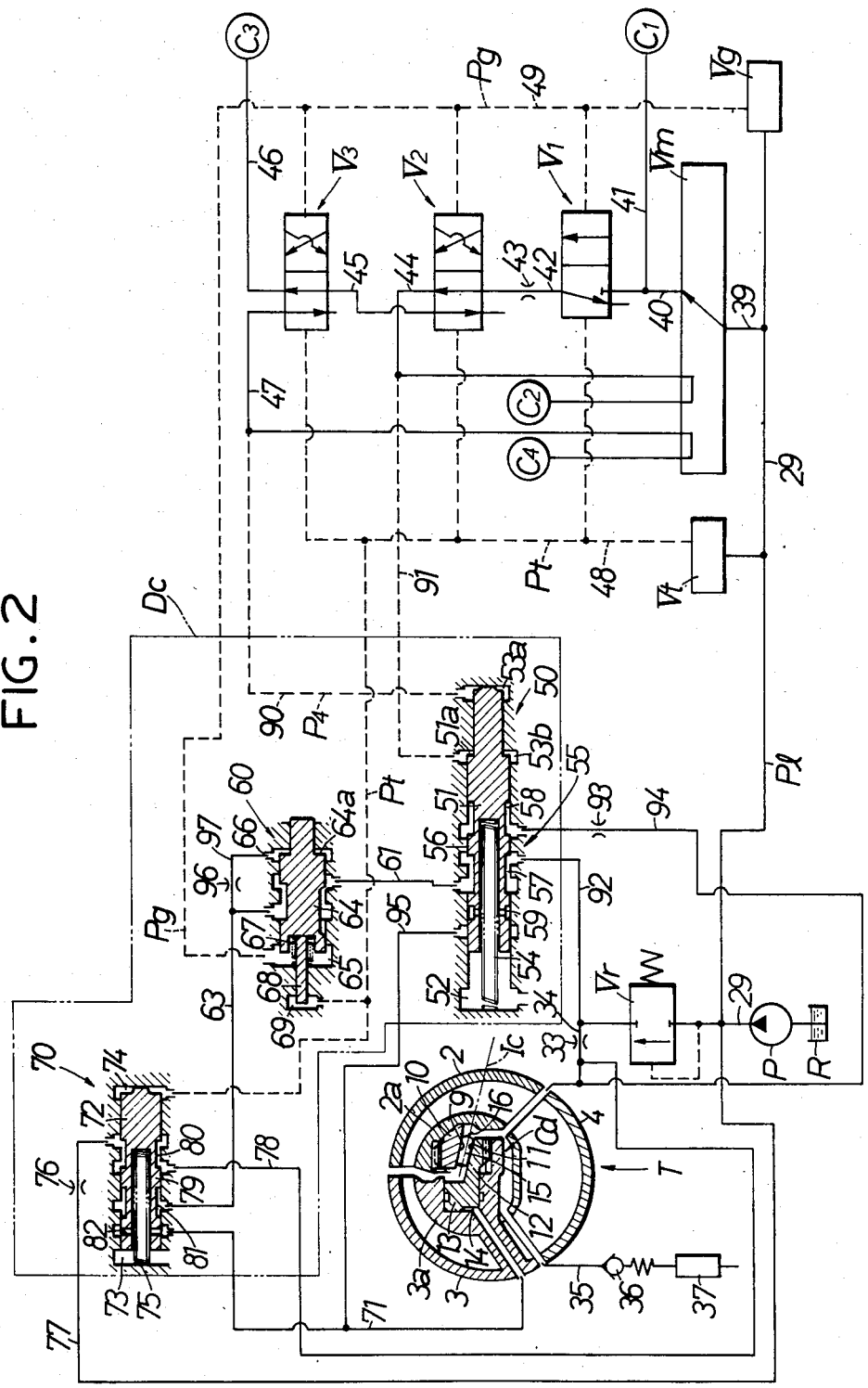
FIG. 2 is a hydraulic control circuit diagram.

A pump driving gear 8 for driving a hydraulic pump P of FIG. 2 is provided at the right end of the pump rotor 2 and a stator arm 4b.for controlling a regulator valve Vr of FIG. 2 is fixed to the right of the stator shaft 4a.

Figure 3:
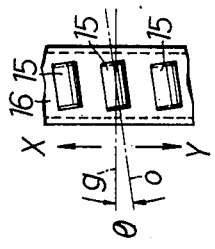
FIG. 3 is a developed view of some principal portion of a direct-coupling clutch.

A direct-coupling clutch Cd of the roller type as a direct-coupling mechanism adapted for mechanically coupling the pump rotor 2 and the turbine rotor 3 together is provided therebetween. Referring to FIGS. 2 and 3 for illustrating them in detail, an annular driving member 10 having a conical drive surface 9 on the inner periphery thereof is spline-fitted to an inner peripheral wall 2a of the pump rotor 2. A driven member 12 having a conical driven surface 11 in parallel with and opposite to the conical drive surface 9 is spline-fitted to an inner peripheral wall 3a of the turbine rotor 3 slidably in the axial direction. A piston 13 is integrally formed with one end of the driven member 12 and the piston 13 is slidably fitted in a hydraulic cylinder 14 which functions as a hydraulically operating part provided on the inner peripheral wall 3a of the turbine rotor 3, the piston 13 being arranged to receive the internal pressures of the cylinder 14 on its left hand face and internal pressure of the torque converter T on right end face simultaneously.

Cylindrical clutch rollers 15 are interposed between the conical drive and driven surfaces 9, 11 and, as shown in FIG. 3, they are supported by an annular retainer 16 in such a manner that their central axis line o is tilted at a predetermined angle $\theta$ to a generatorix g of an imaginary conical surface Ic (FIG. 2) passing the center between both the conical surfaces 9 and 11.

Accordingly, if oil pressure greater than the internal pressure of the torque converter T is introduced into the hydraulic cylinder 14 in such a stage that the torque amplifying function of the torque converter T becomes unnecessary, the piston 13, that is, the driven member 12 is pushed toward the drive member 10. As a result, the clutch rollers 15 are forced into contact with both the conical surfaces 9, 11. If the drive member 10 is rotated relative to the driven member 12 by the output torque of the engine E in the X direction of FIG. 3, the clutch rollers 15 revolve. However, the central axis line o of each clutch roller 15 is tilted so that the revolution of the roller gives a relative axial displacement to both the members 10, 12 so as to make them come close to each other. Consequently, the clutch rollers 15 bite between both the conical surfaces 9, 11 and provide a mechanical coupling between the members 10, 12, that is, between the pump and turbine rotors 2, 3. Even when the direct-coupling clutch Cd operates in this manner, in case the output torque of the engine E exceeding the coupling force of the clutch is applied across both the rotors 2, 3, the clutch rollers 15 generate a slip against the respective conical surfaces 9, 11, dividing the torque into two, part of which is mechanically transmitted through the direct-coupling clutch Cd, the rest being fluid-dynamically transmitted through both the rotors 2, 3. Thus a variable power division system is formed wherein the ratio of the former torque to the latter torque changes according to the extent to which the clutch rollers 15 slide.

During the operation of the direct-coupling clutch Cd, if an inverse load is applied to the torque converter T, the rotational speed of the driven member 12 becomes greater than that of the drive member 10. Accordingly, the drive member 10 rotates in the Y direction relative to the driven member 12, whereas the clutch rollers 15 revolve in the opposite direction, giving a relative axial displacement to both the members 10, 12 so as to make them separate. As a result, the clutch rollers 15 are released from engaging with both the conical surfaces 9, 11 and are allowed to idle. The transmission of the inverse load from the turbine rotor 3 to the pump rotor 2 is effected fluid-dynamically only.

If the oil pressure is released from the hydraulic cylinder 14, the piston 13 is subjected to the internal pressure of the torque converter T and moves back to its initial position, whereas the direct-coupling clutch Cd is made inoperative.

Again in FIG. 1, a first speed gear train $G_1$, a second speed gear train $G_2$, a third speed gear train $G_3$, a fourth speed gear train $G_4$ and a reverse gear train Gr are provided in parallel between the input and output shafts 5, 6 of the auxiliary transmission, which shafts extend parallel with each other. The first speed gear train $G_1$ comprises a drive gear 17 coupled to the input shaft 5 through a first speed clutch $C_1$ and a driven gear 18 engaging with the gear 17 and connectable to the output shaft 6 through a unidirectional clutch Co. The second speed gear train $G_2$ comprises a drive gear 19 connectable to the input shaft 5 through a second speed clutch $C_2$ and a driven gear 20 fixed to the output shaft 6 and engaged with the gear 19. The third speed gear train $G_3$ comprises a drive gear 21 fixed to the input shaft 5 and a driven gear 22 coupled to the output shaft 6 through a third speed clutch $C_3$ and engaged with the gear 21. The fourth speed gear train $G_4$ comprises a drive gear 23 coupled to the input shaft 5 through a fourth speed clutch $C_4$ and a driven gear 24 coupled to the output shaft 6 through a switch clutch Cs and engaged with the gear 23. Further the reverse gear train Gr comprises a drive gear 25 made integral with the drive gear 23 of the fourth speed gear train $G_4$, a driven gear 27 coupled to the output shaft 6 through the switch clutch $C_3$ and an idle gear 26 engaging with both the gears 25, 27. The switch clutch Cs is provided in between the driven gears 24 and 27 and by shifting the selector sleeve S of the clutch Cs to the left, that is, the forward position or the right, that is, the backward position, the driven gears 24, 27 may selectively be coupled to the output shaft 6. The unidirectional clutch Co is used to transmit only the driving torque from the engine E and does not transmit the torque in the opposite direction.

When the selector sleeve S is held in the forward position, as shown, if the first speed clutch $C_1$ only is coupled, the drive gear 17 is coupled to the input shaft 5, whereby the first speed gear train $G_1$ is established and the torque is transmitted from the input shaft 5 to the output shaft 6 through the gear train $G_1$. Subsequently if the second speed clutch $C_2$ is connected while the first speed clutch $C_1$ is connected, the drive gear 19 is coupled to the input shaft 5, whereby the second speed gear train $G_2$ is established and the torque is transmitted from the input shaft 5 to the output shaft 6 through the gear train $G_2$. At this time, although the first speed clutch $C_1$ is also engaged, the second speed instead of the first speed is effected because of the operation of the unidirection clutch Co and this is also the case with the third or fourth speed. If the second speed clutch $C_2$ is released and the third speed clutch $C_3$ is connected, the driven gear 22 is coupled to the output shaft 6, whereby the third gear train $G_3$ is established. If the third speed clutch $C_3$ is released and the fourth speed clutch $C_4$ is connected, the drive gear 23 is coupled to the input shaft 5, whereby the fourth speed gear train $G_4$ is established. If the selector sleeve S of the switch clutch Cs is moved to the right with only the fourth clutch $C_4$ being connected, the drive gear 25 is coupled to the input shaft 5 and the driven gear 27 is coupled to the output shaft 6, whereby the reverse gear train Gr is established. The rearward torque is transmitted from the input shaft 5 to the output shaft 6 through the reverse gear train Gr.

The torque transmitted to the output shaft 6 is then transmitted to a large diameter gear DG of the differential gear Df from an output gear 28 provided at the end of the shaft 6.

In FIG. 2, the hydraulic pump P operates to suck up oil from an oil tank R and send the oil to an actuating oil passage 29 under pressure. This pressurized oil is regulated to a predetermined pressure by a regulator valve Vr before being sent to a manual valve Vm as a manually operated switch valve. The oil pressure is called a line pressure Pl.

The excessive pressurized oil in the regulator valve Vr is led into the torque converter T through an inlet oil passage 34 having an orifice 33 to pressurize the inside thereof to prevent cavitation. An outlet oil passage 35 of the torque converter is provided with a pressure holding valve 36 and the oil having passed through the pressure holding valve 36 is returned to the oil tank R through an oil cooler 37.

The actuating oil passage 29 is coupled to a throttle valve Vt and a governor valve Vg. The throttle valve Vt is controlled in accordance with the amount of depression of a throttle pedal (not shown) and outputs a throttle pressure Pt as an index proportional to the opening of the throttle of the engine E, that is, one representing the output of the engine E, to a pilot oil passage 48. The governor valve Vg is driven by the output shaft 6 of the auxiliary transmission M or the large diameter gear DG of the differential gear Df or the like and gives an output proportional to the vehicle speed, that is, a governor pressure Pg, to the pilot oil passage 49.

The manual valve Vm is interposed between an oil passage 39 branched off the actuating oil passage 29 and an oil passage 40 and is provided with shift positions such as neutral, driving and back positions. This valve Vm allows the oil passages 39, 40 to communicate with each other when it takes the driving position. An oil passage 41 branching off the oil passage 40 is connected to a hydraulically operating part of the first speed clutch $C_1$, whereby the first speed clutch $C_1$ is always in a connected state when the manual valve Vm is at the driving position. The oil pressure in the oil passage 40 is supplied to the first speed clutch $C_1$ and also supplied in a selected manner to respective hydraulically operating parts of the second, third and fourth speed clutches $C_2$, $C_3$ and $C_4$ according to the switching operations of a 1-2 shift valve $V_1$, a 2-3 shift valve $V_2$ and a 3-4 shift valve $V_3$.

The throttle pressure Pt and governor pressure Pg have been applied to both ends of each of the shift valves $V_1 \sim V_3$ and adapted to effect the switching operations of the valves from their lefthand first switching position to the righthand second switching position as the vehicle speed, that is, governor pressure Pg increases. In other words, the 1-2 shift valve $V_1$ is interposed between the oil passage 40 and an oil passage 42 having an orifice 43 and takes the first switching position cutting off the communication between the oil passages 40 and 42 when the vehicle speed is low. Accordingly, the first speed clutch $C_1$ only engages in this state, whereby the speed ratio for the first speed is established.

As the vehicle speed is raised, the 1–2 shift valve $V_1$ is switched over to the second switching position on the right to place the oil passages 40, 42 in communication with each other. At this time, the 2–3 shift valve $V_2$ remains at the first switching position as shown in the drawing and the oil passage 42 communicates with an oil passage 44 led to a hydraulically operating part of the second speed clutch $C_2$. For this reason, the first and second speed clutches $C_1$, $C_2$ are placed in engaged states but only the second speed gear train $G_2$ is established because of the operation of the unidirectional clutch Co (see FIG. 1) and the speed ratio for the second speed is obtained.

As the vehicle speed further increases, the 2–3 shift valve $V_2$ changes its position to the second switching position on the right and the oil passage 42 communicates with an oil passage 45. At this time, the 3–4 shift valve $V_3$ is, as shown in the drawing, located at the first switching position on the left and the oil passage 45 communicates with an oil passage 46 led to a hydraulically operating part of the third speed clutch $C_3$. The third speed clutch $C_3$ thus engages and the speed ratio for the third speed is established.

As the vehicle speed further increases, the 3–4 shift valve $V_3$ is switched over to the second switching position on the right and the oil passage 45 communicates with an oil passage 47 led to a hydraulically operating part of the fourth speed clutch $C_4$. Therefore, the fourth speed clutch $C_4$ engages and the speed ratio for the fourth speed is established.

FIG. 2 subsequently illustrates the construction of an engaging-force control means Dc for controlling the engaging force of the direct-coupling clutch Cd, comprising a timing valve 50 as a switch valve, a modulator valve 60 and an idle release valve 70 as a switching means.

The timing valve 50 is a valve used to release the direct-coupling, that is, the lockup, at the time of speed change. The timing valve 50 comprises a spool valve body 51 movable between a rightward first stable position and a leftward second stable position, a first hydraulic pilot chamber 52 facing the left end face of the valve body 51, a second pilot hydraulic chamber 53a facing the right end face of the valve body 51, a third pilot hydraulic chamber facing a step 51a provided at a right side of the valve body 51 and a spring 54 for pressing the valve body 51 rightwardly. The first pilot hydraulic chamber 52 communicates with the oil tank R, the second pilot hydraulic chamber 53a communicates with a pilot oil passage 90 branching off from the actuating oil passage 47 led to the fourth speed clutch $C_4$ and the third pilot hydraulic chamber 53b communicates with a pilot oil passage 91 branching off from the actuating oil passage 44 led to the second speed clutch $C_2$.

Pressure-receiving areas of the valve body 51 as facing the second and third pilot hydraulic chambers 53a, 53b are substantially made equal to each other. On the outer periphery of the valve body 51 are formed circular grooves 57, 58 with a land 57 interposed therebetween, constituting a supplementary mechanism 55 which controls the communication as well as the interruption between an oil passage 92 communicating at a portion upstream of the orifice 33 with the inlet oil passage 34 leading to the torque converter T and a first supplementary oil passage 94 communicating at a portion downstream of the orifice 33 with the inlet oil passage 34, the passage 94 being equipped with an orifice 93. When both the oil passages 92, 93 communicate with each other, they function to supply pressurized oil to the torque converter T while bypassing the orifice 33.

In the timing valve 50, when the first or third speed ratio is set up, the valve body 51 is located at the righthand first stable position, whereas it is located at the lefthand second stable position when the second or fourth speed ratio is established. In such a state that the valve body 51 is located in the first or second stable position, the oil passage 92 for introducing the pressurized oil from the regulator valve Vr communicates with an output oil passage 61 leading to a modulator valve 60, whereas it is isolated from the first supplementary oil passage 94 by the land 56 of the supplementary mechanism 55. Furthermore, a drain oil passage 95 branching off from an oil passage 71 leading to the hydraulic cylinder 14 of the direct-coupling clutch Cd is isolated from the oil tank R.

When the valve body 51 is in a way of shifting from the first to second stable position or vice versa, that is, during the speed change operation, the oil passages 92, 61 are temporarily isolated from each other. Moreover, during that time, the oil passage 92 is made to communicate with the first supplementary oil passage 94 through the circular groove 58 of the supplementary mechanism 55 and the drain oil passage 95 is made to communicate with the first pilot hydraulic chamber 52, that is, the oil tank R through an oil passage 59 made in the valve body 51. In other words, when the valve body 51 is being switched over, the pressurized oil in the hydraulic cylinder 14 is released to the oil tank R and a larger amount of the pressurized oil is supplied to the torque converter T through the first supplementary oil passage 94, whereby the release of lockup of the torque converter T is promoted as described later.

The modulator valve 60 is provided between the output oil passage 61 and an oil passage 63 and comprises a spool valve body 64 movable between the lefthand closing position and right-hand opening position, a first pilot hydraulic chamber 65 facing the lefthand end face of the valve body 64, a second pilot hydraulic chamber 66 facing a right-hand shoulder 64a provided at a right-hand end of the valve body 64, a plunger 68 made to penetrate in the first pilot hydraulic chamber 65 and contact the valve body 64, a third pilot hydraulic chamber 69 facing the lefthand end face of the plunger 68 and a spring 67 housed in the first pilot hydraulic chamber 65. The pilot oil passage 49 guiding the governor pressure Pg from the governor valve Vg is made to communicate with the first pilot hydraulic chamber 65 and the governor pressure Pg is thus introduced into the first pilot hydraulic chamber 65. The throttle oil passage 48 guiding the throttle pressure Pt from the throttle valve Vt is made to communicate with the third pilot hydraulic chamber 69 and the throttle pressure Pt operates on the third pilot hydraulic chamber 69. Furthermore, the oil passage 63 is made to communicate with the second pilot hydraulic chamber 66 through an oil passage 97 having an orifice 96.

In the modulator valve 60, the spool valve body 64 is urged to the open position by the throttle pressure Pt and governor pressure Pg and to the closing position by the output pressure of the modulator valve 60 itself. The modulator valve 60 accordingly functions to amplify the oil pressure as outputted to the oil passage 63, that is, the actuating oil pressure of the direct-coupling clutch Cd, in proportion to the throttle opening.

An idle release valve 70 is provided between a second supplementary oil passage 77 having an orifice 76 and communicating with an oil passage 77 and the hydraulic pump P and the oil passage 71 leading to the hydraulic cylinder 14 of the direct-coupling clutch Cd as well as a third supplementary oil passage 78 communicating at a portion downstream of the orifice 33 with the inlet oil passage 34 of the torque converter T. The idle release valve 70 comprises a spool valve body 72 movable between the right-hand first switching position and the lefthand second switching position, a first pilot hydraulic chamber 73 facing the lefthand end face of the valve body 72, a second pilot hydraulic chamber 74 facing the right-hand end face of the valve body 72 and a spring 75 for biasing the valve body 72 housed in the first pilot hydraulic chamber 73 toward the right-hand first switching position.

The first pilot hydraulic chamber 73 is made to communicate with the oil tank R, whereas the second pilot hydraulic chamber 74 is made to communicate with the pilot oil passage 48 which guides the throttle pressure Pt. On the periphery of the valve body 72 are also provided two circular grooves 80, 81 with a land 79 interposed therebetween and further the valve body 72 is provided with a radially extending oil passage 82 communicating with the first pilot hydraulic chamber 73.

In the idle release valve 70, the valve body 72 is located in the first switching position as shown in the drawing when the throttle pressure Pt in the second pilot hydraulic chamber 74 is smaller than the force of the spring 75 and the oil passage 71 is made to communicate with the first pilot hydraulic chamber 73, that is, the oil tank R through the oil passage 82, whereas the oil passage 63 is isolated from the oil passage 71. Moreover, the second supplementary oil passage 77 is made to communicate with the third supplementary oil passage 78 through the circular groove 80 and the pressurized oil from the hydraulic pump P is regulated its amount of flow by the orifice 76 and supplemented to the torque converter T from the second supplementary oil passage 78. As the throttle pressure Pt is raised by the depression of the throttle pedal to overcome the force of the spring 75, the valve body 72 moves to the second switching position. At this switching position, the oil passage 63 is made to communicate with the oil passage 71 through the circular groove 81 and the second supplementary oil passage 77 is isolated from the third supplementary oil passage 78.

The idle release valve 70 thus operates to release the oil pressure in the hydraulic cylinder 14 and supplement the pressurized oil to the torque converter T when the opening of the throttle is located at the idle position, thereby releasing the direct-coupling clutch Cd, that is, the lockup of the torque converter T.

The operation of this embodiment will subsequently be described. Since the capacity of engagement of the direct-coupling clutch Cd is determined by the function of the pressure differential between the actuating pressure supplied to the hydraulic cylinder 14 through the oil passage 71 and the internal pressure supplied to the torque converter T through the inlet oil passage 34, the engaging capacity obtained only by raising the actuating pressure tends to become rather insufficient during a high-speed cruising which requires larger engaging force. For this reason, attempts are made to set the internal pressure of the torque converter T as low as possible by, for instance, reducing the pressure for opening the pressure hold valve 36 or by further throttling the orifice 33. In these cases, however, the lockup releasing force as determined only by the internal pressure of torque converter T is reduced and the lockup is insufficiently released at the time of instantaneous speed change operation. On the contrary, in the invention, the oil passages 92, 93 are made to communicate with each other by the operation of the supplementary mechanism 55 in the timing valve 50 synchronously with the speed change operation and a large quantity of pressurized oil is supplemented to the torque converter T. Accordingly, the internal pressure of the torque converter T is temporarily raised at the time of speed change, so that the release of lockup can be effected sufficiently. Furthermore, since the internal pressure of the torque converter T always acts on the lockup releasing side, the response efficiency in the lockup release during the speed change operation will hardly be impaired.

If the lockup release of the torque converter T is sufficiently effected, the shock caused by the speed change is prevented from being further amplified. In this case, if the internal pressure of the torque converter T is excessively raised, the released state will continue for a time even after completion of the speed change operation. The number of revolution of the engine will therefore increase by the extent corresponding to the hydraulic slippage occurred in the torque converter T and this may cause the passenger to feel an unnatural speed change. Although this phenomenon is in principle unavoidable, it is desirable to prevent the internal pressure of the torque converter T from excessively increasing in order to shorten such time of continuation of the released state. The orifice 93 provided in the first supplementary oil passage 94 can serve such function.

In addition, the operation of the idle release valve 70 makes the second and third supplementary oil passages 77, 78 communicate with each other when the throttle pedal is located at the idle position and consequently the pressurized oil is supplied to the torque converter T from the hydraulic pump P. The internal pressure of the torque converter T is thus raised and the release of the lockup is promoted.

Moreover, when a speed change is effected with the throttle pedal being released during vehicle travelling, for instance, when a driver's foot is released from the throttle pedal the gear is shifted up during acceleration or when the gear is shifted down after having reduced the speed to some degree, the pressurized oil from the hydraulic pump P is introduced to the torque converter T as mentioned above by releasing the throttle pedal and so the line pressure Pl is reduced to that extent. As a result, the engaging speed of clutches to be engaged newly can be mitigated so that the shock caused by the speed change can mitigated considerably.

In order to further enhance the effect of mitigating the shock caused by the speed change, in place of the line for supplementing the pressurized oil from the hydraulic pump P through the second supplementary oil passage 77, a supplementary oil passage, which extends from the oil passage 42 at a portion downstream of the orifice 43 in the between the 1-2 shift valve $V_1$ and the 2-3 shift valve $V_2$ toward the idle release valve 70, may be provided, which will promote oil pressure reduction and further mitigate the shock caused by the speed change as the result of a throttling effect by the orifice 43.

What is claimed is:

1. In a vehicular automatic transmission including: a fluid type torque converter having an input member and an output member; an auxiliary gear transmission coupled in series with said torque converter for selectively shifting gears in said auxiliary transmission into a gear ratio of one of a plurality of different gear ratios and a direct coupling mechanism for directly mechanically coupling said input and said output members in response to the difference between a fluid actuating pressure acting to establish coupling between the input and output members and the internal fluid pressure of said torque converter;

a direct-coupling control system which comprises a switch valve for exhausting said actuating pressure to an oil tank synchronously with a gear shift operation; and a supplementary mechanism for feeding fluid pressure to said fluid torque converter synchronously with said gear shift operation, so as to raise the internal pressure of said torque converter;

whereby when said gear shifting is effected, said internal pressure of said torque converter is raised with additional pressure from said supplementary mechanism while said actuating pressure is released to said oil tank through said switch valve, thereby disconnecting said input member from said output member.

2. A direct-coupling control system according to claim 1, wherein said internal pressure is supplied to the torque converter from a pressure source through a regulator means, an oil line connecting said torque converter and said regulator means, an orifice interposed in said oil line connecting said torque converter and said regulator means, a supplementary oil passage branched from said oil line connecting said torque converter and said regulator means at a position upstream of said orifice and leading to said torque converter, said supplementary mechanism being interposed in said supplementary oil passage.

3. A direct-coupling control system according to claim 2, wherein a second orifice is disposed at an intermediate portion of said supplementary oil passage downstream of said supplementary mechanism.

4. A direct-coupling control system according to claim 2, wherein when said gear shift operation is not conducted, a pressure in said supplementary oil passage is utilized as said actuating pressure.

5. A direct-coupling control system according to claim 4, wherein said pressure, to be utilized as said actuating pressure, is fed to said torque converter after having been raised in level in accordance with a vehicle travelling condition.

6. In a vehicular automatic transmission including: a fluid type torque converter having an input member and an output member and being normally supplied with an internal pressure for disengaging said input member from said output member; an auxiliary transmission coupled in series with said torque convert for selectively switching a gear ratio in said auxiliary transmission to one of a plurality of different gear ratios; and a direct-coupling mechanism for directly mechanically coupling said input member with said output member as a function of the difference between an actuating pressure acting to establish coupling between said input and output members and said internal pressure;

a direct-coupling control system comprising an independently disposed supplementary oil passage leading from a pressure source to an interior of said torque converter; and switch means adapted to take, when a throttle opening is located at an idle position, a switch position at which the actuating pressure of said direct-coupling mechanism is released to an oil tank and at which said supplementary oil passage is opened;

whereby when the throttle opening comes to said idle position, the internal pressure of said torque converter is raised with supply of additional pressure from said source through said supplementary oil passage while said actuating pressure is released to the oil tank, thereby disconnecting said input member from said output member.

7. In a vehicular automatic transmission including: a fluid type torque converter having an input member and an output member and normally supplied with an internal pressure for disconnecting said input member from said output members; an auxiliary transmission having hydraulically operating parts and coupled in series with said torque converter for selectively switching a gear ratio in said auxiliary transmission to one of a plurality of different gear ratios; and a direct-coupling mechanism for directly mechanically coupling together said input member with output member with an engaging capacity determined by the difference between an actuating pressure acting to establish coupling between the input and output members and said internal pressure;

a direct-coupling control system comprising a regulator valve coupled to an inlet oil passage of said torque converter for regulating oil pressure to said torque converter, said internal pressure being fed from a pressure source to the torque converter through said regulator valve; an oil passage connecting said regulator valve and said pressure source; an independently disposed supplementary oil passage branched from said oil passage connecting said regulator valve and said pressure source, said supplementary oil passage leading to said torque converter; and switch means adapted to take, when a throttle opening is located at an idle position, a switch position at which the actuating pressure of the direct-coupling mechanism is released to an oil tank and at which said supplementary oil passage is opened;

whereby when the throttle opening comes to said idle position, the internal pressure of said torque converter is raised with supply of additional pressure taken from said oil passage connecting said regulator valve and said pressure source through said supplementary oil passage while said actuating pressure is released to the oil tank, thereby disconnecting said input member and said output member.

8. A direct-coupling control system according to claim 7, further comprising a pressure holding valve for holding said internal pressure of the torque converter below a predetermined level.

9. A direct-coupling control system according to claim 8, wherein an orifice is interposed in said inlet oil passage.

* * * * *